S. THURSTENSEN.
APPLIANCES FOR ARTIFICIAL REFRIGERATING PLANTS.
APPLICATION FILED AUG. 5, 1913.
1,149,871.
Patented Aug. 10, 1915.
5 SHEETS—SHEET 1.
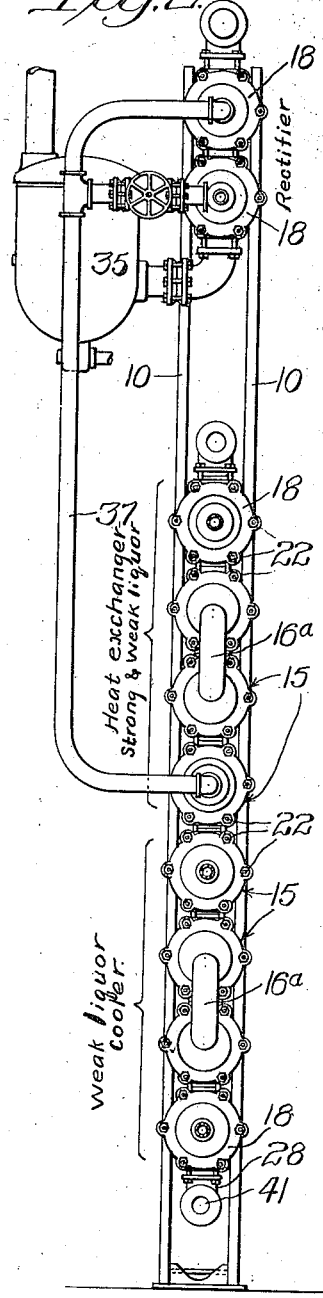
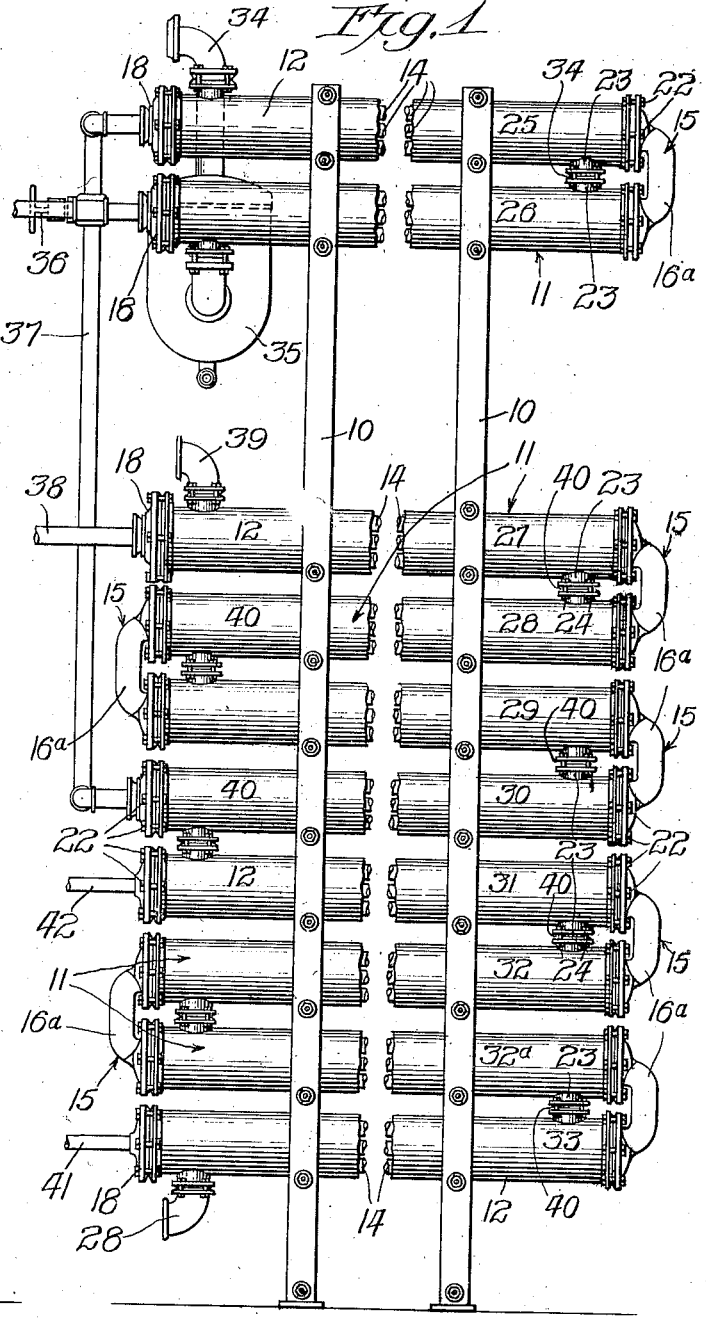

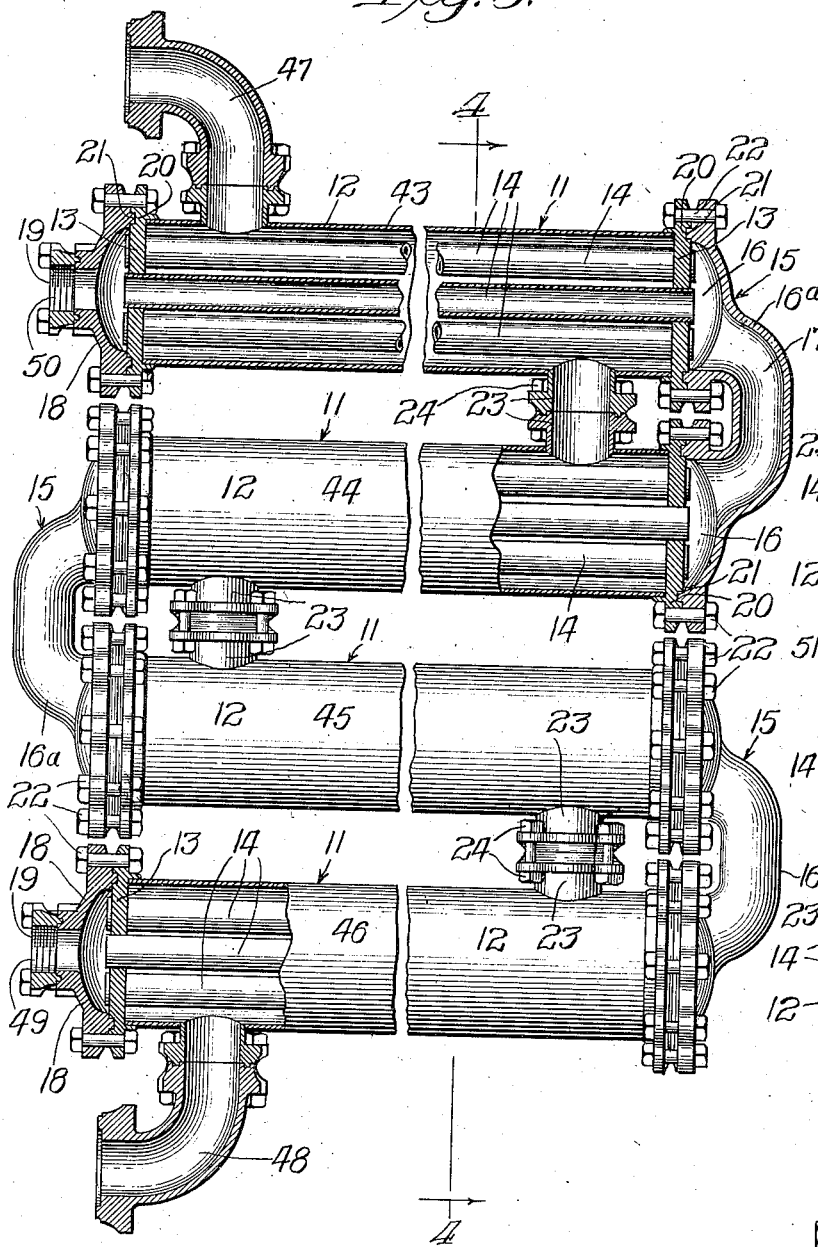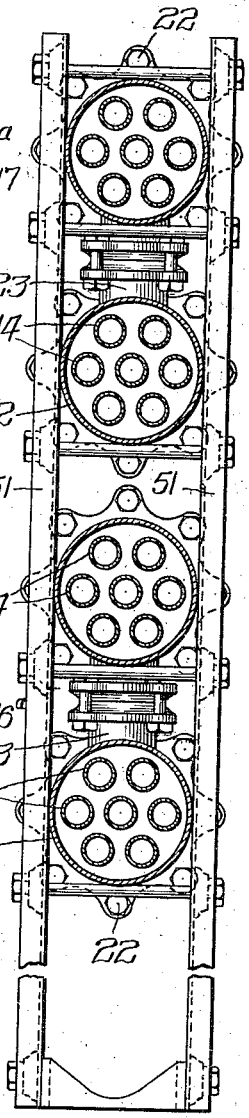
S. THURSTENSEN.
APPLIANCES FOR ARTIFICIAL REFRIGERATING PLANTS.
APPLICATION FILED AUG. 5, 1913.
1,149,871.
Patented Aug. 10, 1915.
5 SHEETS—SHEET 2.
Fig. 5.
Fig. 4.
Witnesses:
Harry S. Gaither
T. Ford
Inventor
Soren Thurstensen
by Banning & Banning
Attys

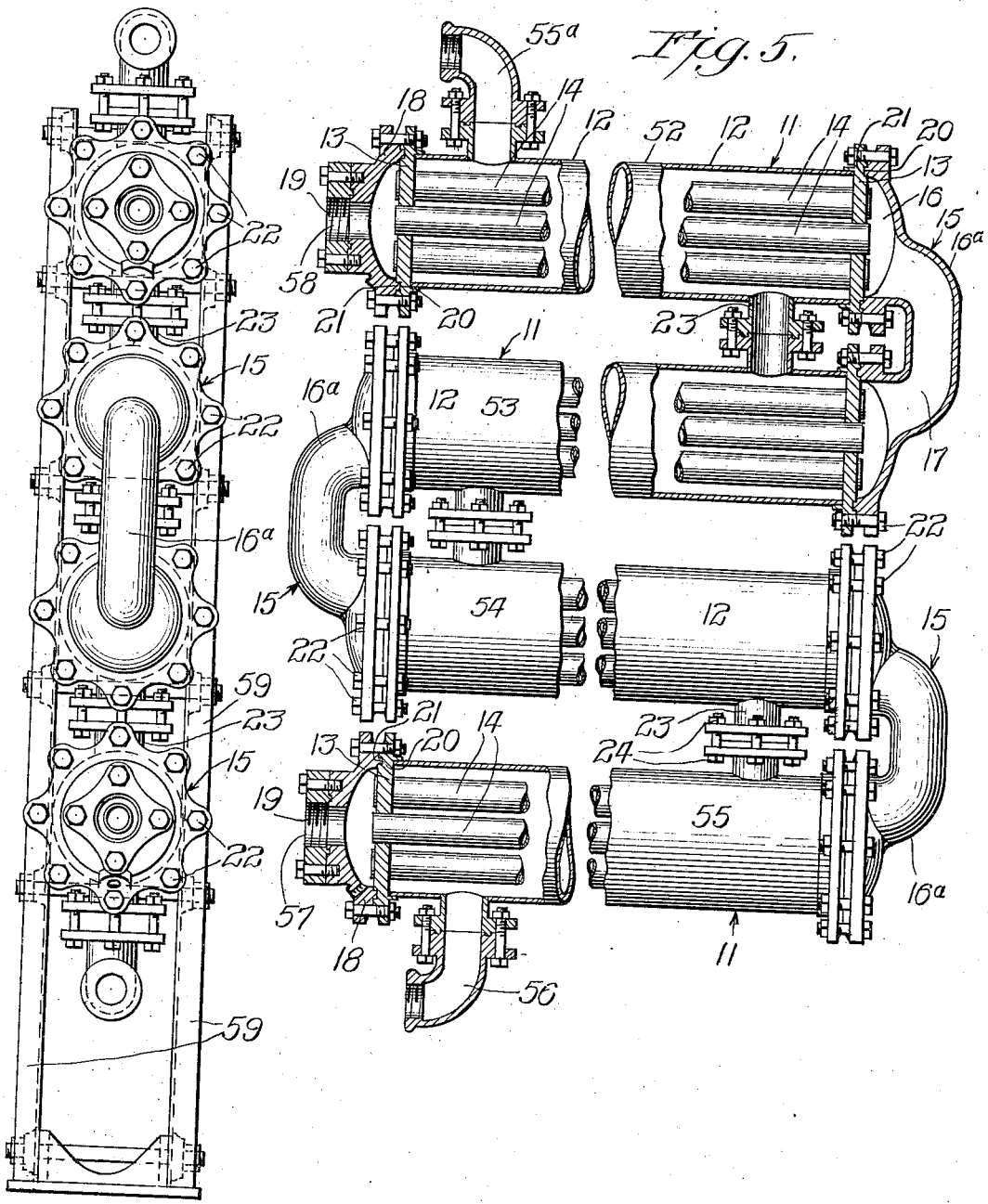

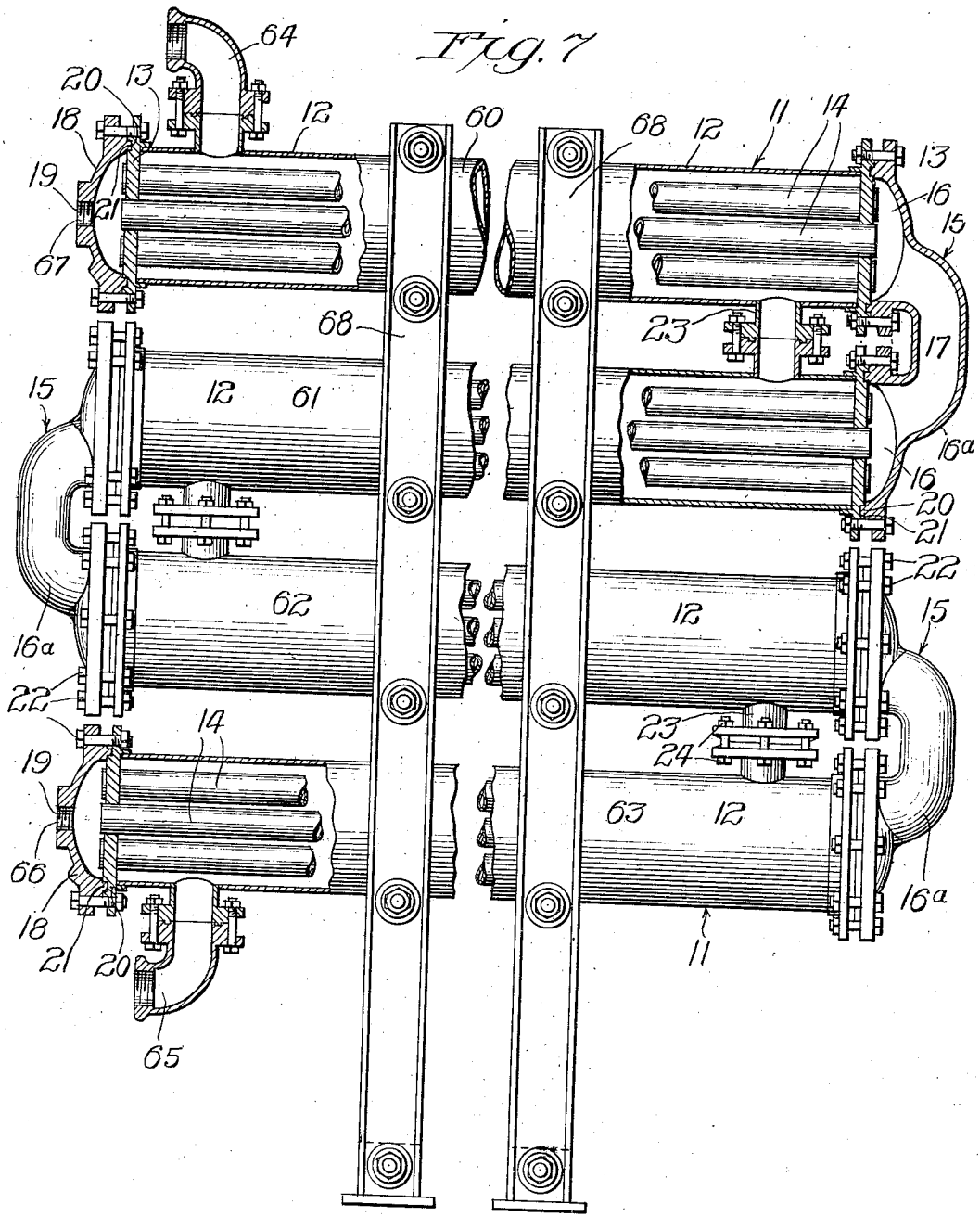

S. THURSTENSEN.
APPLIANCES FOR ARTIFICIAL REFRIGERATING PLANTS.
APPLICATION FILED AUG. 5, 1913.
1,149,871.
Patented Aug. 10, 1915.
5 SHEETS—SHEET 5.
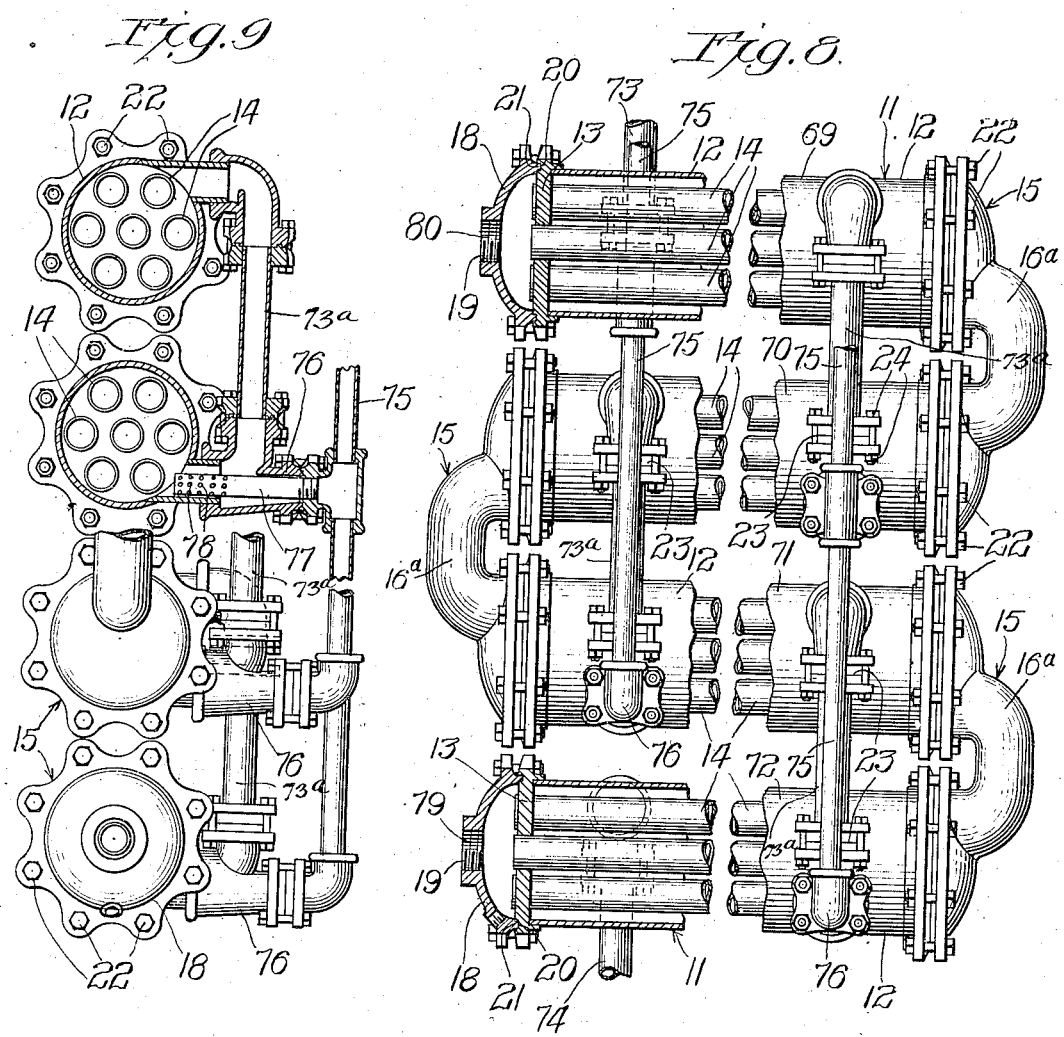

UNITED STATES PATENT OFFICE.

SOREN THURSTENSEN, OF LOUISVILLE, KENTUCKY, ASSIGNOR TO HENRY VOGT MACHINE COMPANY, OF LOUISVILLE, KENTUCKY, A CORPORATION OF KENTUCKY.

APPLIANCES FOR ARTIFICIAL REFRIGERATING PLANTS.

1,149,871.

Specification of Letters Patent.   Patented Aug. 10, 1915.

Application filed August 5, 1913.   Serial No. 783,073.

*To all whom it may concern:*

Be it known that I, SOREN THURSTENSEN, a citizen of the United States, residing at Louisville, in the county of Jefferson and State of Kentucky, have invented certain new and useful Improvements in Appliances for Artificial Refrigerating Plants, of which the following is a specification.

The present invention relates to a series of appliances or devices used in connection with refrigerating machinery, to reclaim, or to recover the freezing medium after it has served its purpose of refrigeration, whereby it may be used repeatedly in the refrigerating process.

The objects of the present invention are to construct such appliances in the form of a series of elements, so that they may be arranged one above the other in vertical alinement, thereby decreasing the amount of space necessary to house the same; to establish separated passages for the conduction of the different mediums, whereby an exchange of temperature between the mediums is effected; to arrange said passages whereby a relatively large amount of radiating surface is provided; and to provide simple and effective means for conducting the mediums from one of the elements to the other, and to arrange means for sealing the various elements, so as to prevent a leakage during the transmission of the mediums therethrough.

The invention further consists in the features of construction and combination of parts hereinafter described and claimed.

In the drawings: Figure 1 is a side elevation of a series of elements constructed in accordance with the teachings of the present invention, and arranged one above the other, the elements in this figure being arranged and constructed so as to provide the necessary apparatus for exchanging temperatures in small refrigerating plants; Fig. 2 an end view of the part shown in Fig. 1; Fig. 3 a cross section through a portion of the device shown in Figs. 1 and 2, which device is for the purpose of exchanging temperatures between gas and rich liquor, and is termed a rectifier; Fig. 4 a cross section on line 4—4 of Fig. 3, looking in the direction of the arrow; Fig. 5 a side elevation, partly in section of a form of device used to exchange temperatures between rich liquor and weak liquor, and is termed an exchanger; Fig. 6 an end view of the parts shown in Fig. 5; Fig. 7 a side elevation, partly in section of a form of device for exchanging temperatures between weak liquor and water, and is termed a weak liquor cooler; Fig. 8 a side elevation, partly in section of a device for exchanging temperatures between weak liquor and water and for injecting gas into the weak liquor, and is termed an absorber; and Fig. 9 an end view, partly in section of the device shown in Fig. 8.

In ice plants and other refrigerating mechanisms, a freezing medium is used which is usually either aqua or anhydrous ammonia that has a relatively low boiling point, the gas from this ammonia is condensed and the liquefied ammonia is admitted into the freezing coil or coils. This liquid evaporates in passing through the coils, and produces a refrigerating action, cooling the coils, and causing them to act as a means for making ice or producing the low temperature necessary for a cold storage room. It would be highly impracticable in these devices to use the freezing medium once, and then let it pass off in the shape of a waste product, and accordingly all plants are equipped with means for reconverting or restoring the freezing medium back to its original state, after it has passed through the freezing coils, so that it may be used over and over again, and the appliances of the present invention are intended to perform this reclaiming or regenerating action; the appliances are intended for use in absorption refrigeration process. It is necessary to exchange temperatures between the various mediums entering into the composition of the ammonia in order to place the ammonia back into its original state, and the appliances of the present invention provide means for circulating the various mediums through separated passages so that the temperatures from the various mediums will affect the walls of one class of passages, and thus an exchange of temperature between the circulated medium in all the passages is brought about.

Referring to the drawings, and particularly to Fig. 1, the device there illustrated shows rectifier, exchanger and weak liquor cooler in one unit. It is of more special practicability, however, for small refrigerating plants, and is illustrated more for the purpose of showing the adaptability of the apparatuses of the present invention to be arranged in vertical relation to one another, so as to occupy a relatively small space within the factory. The appliances are supported, as shown in this figure by suitable standards or uprights 10, which may be of any suitable form or construction, and the regenerating or reclaiming apparatus comprises a series of elements which are designated by the general numeral 11. The details of mechanical construction of these elements are shown more clearly in Figs. 3 to 7 inclusive, and a discussion of these figures will be taken up before completing the discussion of Fig. 1.

Fig. 3 illustrates an apparatus which is used as a rectifier; that is which is used for the purpose of exchanging temperatures between the rich liquor and the gas, and as shown the device consists of four elements similar as respects mechanical construction, to the elements 11 illustrated in Fig. 1. Each of these elements consists of an outer section in the form of a cylindrical shell 12, which is closed at both ends by means of a cross wall 13, preferably welded to the body of the shell. Held by these cross walls and having their ends projecting through and beyond the cross walls are a series of pipes or conduits 14, which as shown are 7 in number.

By providing a plurality of conduits a relatively large amount of radiating surface is provided, so that the medium flowing through the outer section or shell is subjected to the action of the temperature radiating from the plurality of conduits, and thus an efficient exchanging of temperature between the medium flowing through the shell, and the medium flowing through the conduits is effected. Secured to the ends of the elements are what may be termed end pieces 15. These pieces are formed in pairs to provide an end piece for each of the two adjacent elements and all of the end pieces are of convex formation in cross section as to provide a chamber 16 when they are placed in position. Such of the end pieces as are formed in pairs are connected by a web 16$^a$ which is chambered to provide a passage 17, communicating with the chamber 16. When thus secured in position these cap pieces 15 serve to connect and space the adjacent elements apart, and serve at the same time to provide a communicating passage between the conduits 14 of one element and the conduits 14 of the element adjacent thereto, by means of the chambers 16 and passage 17. This double form of end piece is employed in each instance except at one end of each of the bottom and top elements. These single end pieces are indicated by the numeral 18. The end pieces 18 are provided with an interiorly threaded flange 19 adapted to receive the end of a pipe or conduit which supplies and discharges the medium which flows through the conduits 14. Each of the cap pieces engages with an end wall 13, as will be seen from the drawings, and the connection between the cap pieces and end walls is in the nature of a tongue and groove. In the construction shown the end walls are provided with a groove 20, and the cap pieces with the tongue 21 adapted to enter said groove. The cap pieces are joined to the cross walls of the various elements by means of suitable locking members 22, as for instance the nuts and bolts illustrated. The double cap pieces, as explained, are the means for establishing communication between the conduits 14 of the various elements, and means are shown for establishing communication between the shells 12 of the various elements, in the nature of short necks 23 welded to the shells, which meet as shown in the drawings, and the abutting ends of the necks, as shown, are provided with a tongue and groove joint. These necks are held together by suitable locking means 24.

Now referring to the construction shown in Fig. 1, the device therein illustrated consists of a series of elements 25, 26, 27, 28, 29, 30, 31, 32, 32$^a$ and 33, each of which is exactly similar in mechanical construction to the elements 11 previously described. These elements, as previously explained, are arranged in vertical alinement one above the other. Gas is admitted through a gas inlet 34 into the chamber of the casing 12 of the element 25 and flows down through the connection 34 between the elements 25, and 26 and into a separator 35 in which the water is separated. The rich liquor enters through a rich liquor inlet 36, flows through the tubular members 14 of the element 26 through the double cap piece 15 connecting the elements 25 and 26, and into the tubular members of the element 25. Thus a circulation in counter directions of rich liquor and gas is maintained through the elements 25 and 26, and an exchange of temperature between the two mediums, namely the gas and rich liquor is brought about. The rich liquor after passing through the tubular conduits 14 of the element 25 flows through a pipe 37 down and into the conduits 14 of the element 30 and then passes upward through the tubular conductors and the chambers of the cap pieces until it has passed through the elements 29, 28 and 27 and discharged through the rich liquor outlet 38. The weak liquor is admitted at the weak liquor inlet 39 and flows down and through the body portions 12 of the elements 27, 28, 29, 30, 31, 32$^a$ and 33. Communication between the various elements being brought about by means of the neck connections 40, thus through the elements 27, 28, 29, and 30 there will be flowing a volume of rich liquor, and a volume of weak liquid flowing in an opposite direction, and an exchange of temperature will thus be brought about between these two mediums.

Water is admitted to the tubular conduits 14 of the element 33 through a water inlet pipe 41, and the water passes upward and through the tubular conduits of the elements 33, 32ª, 32, and 31 and flows out through the water outlet pipe 42, thus through the elements 31, 32, 32ª, and 33 there is a body of water and weak liquor circulating in opposite directions so that an exchange of temperature is brought about between these two. The rich liquor, weak liquor and gas after passing through these various appliances, pass out to other portions of the plant. These appliances above described perform all of the steps necessary to place the various mediums in proper condition for reclamation into freezing medium. It, however, is more particularly adapted for use in small plants.

The appliances used in connection with larger plants are illustrated more particularly in Figs. 3 to 9 inclusive. In Figs. 3 and 4 is illustrated an appliance which is used as a rectifier, and which is for the purpose of exchanging temperatures as between the gas and rich liquor. The mechanical features of construction of this application have already been explained, and as stated comprises a series of elements 11 of a certain mechanical structure. As shown there are four of these elements employed in connection with the rectifier and they are indicated by the numerals 43, 44, 45, and 46 which are connected together by cap pieces 15 of the type previously described. Each element comprises the shell like section 12 and the tubular members 14. Gas is admitted to the elements 43 through the gas inlet 47, passes downward through the shell like portion of the elements 43, 44, 45, and 46 and passes out through the gas outlet 48. The rich liquor is admitted at the rich liquor inlet 49, passes upward through the tubular member 14 of the elements 46, 45, 44, and 43, and out through the rich liquor outlet 50. Communication between the conduits 14 of one element and the conduits 14 of the adjacent element is provided through the medium of the cap piece 15, as has been explained, and as will be apparent from the drawings. Thus in this apparatus we have a volume of gas flowing in one direction and a volume of rich liquor in the opposite direction through the various elements of the device, the gas or rich liquor being separated from one another during such passage. Owing to the provision of a plurality of conductors 14, a great amount of radiating surface is exposed to the action of the medium flowing through the shell like portions 12 of the elements, and thus the various mediums are exposed to the action of one another to a degree to effectually accomplish the work intended. The elements of Figs. 3 and 4 are sustained in substantial vertical alinement with one another through the instrumentalities of suitable supports 51.

The appliance shown in Figs. 5 and 6 relate to what may be termed an exchanger and consists, as shown, of four elements indicated by the numerals 52, 53, 54, and 55. Each of the elements is similar in construction as to mechanical features to the elements 11 previously described. Weak liquor enters at the weak liquor inlet 55ª, passes down and through the interior of the shell like members 12 of the elements 52 and 55 inclusive, passes out through the weak liquor outlet 56. The rich liquor is admitted through the rich liquor inlet 57, passes through the conduits 14 of the elements 52 and 55 inclusive and out through the rich liquor outlet 58, the rich liquor passing upward through the various elements, thus passing them in opposite directions and effecting an exchange of temperature between these two mediums. The elements shown in Figs. 5 and 6 are supported in vertical alinement with respect to one another by suitable supports 59.

The device or appliance shown in Fig. 7 is a weak liquor cooler and consists of four elements 60, 61, 62, and 63, each similar in construction to the element 11 previously described. In this appliance weak liquor is admitted at the weak liquor inlet 64 passes downward through the interior of the shell 12 of the elements 60 to 63 inclusive, and passes out through the weak liquor outlet 65. Water is admitted at the water inlet 66, flows through the conduits 14 of the elements 60 to 63 inclusive and out through the water outlet 67. In this appliance the weak liquor and water are passed through the various elements in opposite directions and an exchange of temperature is brought about between these two mediums. The various elements illustrated in this figure are supported in vertical arrangement through the medium of suitable supports 68.

The device shown in Figs. 8 and 9 is termed an absorber, and consists, as shown, of four elements, 69, 70, 71, and 72, similar in construction to the elements 11 previously described, in this case, weak liquor is admitted at the weak liquor inlet 73, passes downward through the bodies 12 of the elements 69 to 72 inclusive through the pipe 73ª connecting the various elements and out through the strong liquor outlet 74. In thus passing downward gas is admitted which is absorbed by the weak liquor during its transit. The gas is admitted to a pipe 75, which passes down and into a fitting 76 which is provided with a tube 77 having therein a series of perforations or openings 78. This tube 77 is located at the point of inlet of the weak liquor into the interior of the shell like sections 12, so that the weak liquor in passing into the sections 12 passes by the perforated portions of the tube 77, and the gas is injected and absorbed by the weak liquor. Water is admitted at the water inlet 79 and passes upward through the conduits 14 of the elements 69 to 72 inclusive and out through the water outlet 80. Thus we have in this appliance weak liquor charged with gas flowing in one direction through the sections 12 of the various elements and water flowing in an opposite direction through the conduits of the various elements thus effecting a change of temperature between these two mediums.

It will be noted that the mechanical features of all of the appliances described followed one another. All of them contain a multitude of conducting tubes 14, all of them contain the feature of the cross walls 13, all of them contain the feature of the chambered cap pieces 15, all of them contain the feature of the connecting necks 23, and all of them contain the feature of the tongue and groove connection between the cap pieces and the cross wall; and between the necks extending from the various shell like sections 12. Thus the mechanical principles involved are maintained throughout all the necessary appliances used in reclaiming or reconverting the freezing medium back to its original state, and all of the appliances are of the nature so that the various elements can be arranged one above the other in vertical alinement, thus conserving the necessary space used for the installation of such appliances.

I claim:

1. In an appliance of the class described, the combination of a series of shell-like bodies arranged one above the other, a tube extending longitudinally through each of said bodies, means connecting the tube of one body with the tube of the next adjacent body means for admitting water to the tube of the lowermost body, means for admitting weak liquor to the interior of the uppermost body, a hollow connection between each of the bodies extending from the upper portion of one of said bodies to the lower portion of the body next beneath, and means for admitting gas to the lower portion of said connection, substantially as described.

2. In an appliance of the class described, the combination of a series of shell-like bodies arranged one above the other, a tube extending longitudinally through each of said bodies, means connecting one body with the tube of the next adjacent body, means for admitting water to the tube of the lowermost body, means for admitting weak liquor to the interior of the uppermost body, a hollow connection between each of the bodies extending from the uppermost portion of one of said bodies to the lower portion of the body next beneath a perforated pipe at the lower portion of said body connections, and means for admitting gas to said pipe, substantially as described.

SOREN THURSTENSEN.

Witnesses:
B. F. KUBAUGH,
H. T. FISCHER.